US011299217B1

(12) United States Patent
James et al.

(10) Patent No.: US 11,299,217 B1
(45) Date of Patent: Apr. 12, 2022

(54) PIVOTING CAB EXTENDER APPARATUS, SYSTEM AND METHODS

(71) Applicants: Mark Timothy James, Stokesdale, NC (US); Christopher Ryan Leroux, Asheboro, NC (US)

(72) Inventors: Mark Timothy James, Stokesdale, NC (US); Christopher Ryan Leroux, Asheboro, NC (US)

(*) Notice: Subject to any disclaimer, the term of this patent is extended or adjusted under 35 U.S.C. 154(b) by 112 days.

(21) Appl. No.: 16/841,767

(22) Filed: Apr. 7, 2020

Related U.S. Application Data

(60) Provisional application No. 62/830,890, filed on Apr. 8, 2019.

(51) Int. Cl.
*B62D 35/00* (2006.01)
(52) U.S. Cl.
CPC ................................. *B62D 35/001* (2013.01)
(58) Field of Classification Search
CPC .................................................. B62D 35/001
See application file for complete search history.

(56) References Cited

U.S. PATENT DOCUMENTS

| 4,518,188 | A | 5/1985 | Witten | |
|---|---|---|---|---|
| 4,904,015 | A * | 2/1990 | Haines | B62D 35/001 296/180.3 |
| 6,846,035 | B2 * | 1/2005 | Wong | B62D 35/001 296/180.1 |
| 8,196,993 | B2 * | 6/2012 | Smith | B62D 35/001 296/180.3 |
| 8,403,401 | B2 * | 3/2013 | Rinehart | B62D 35/001 296/180.3 |
| 8,925,999 | B2 | 1/2015 | Nelson et al. | |
| 9,027,686 | B2 | 5/2015 | He et al. | |
| 9,656,698 | B2 | 5/2017 | Smith | |
| 9,873,467 | B2 * | 1/2018 | Wall, II | B62D 35/001 |
| 2004/0075298 | A1 * | 4/2004 | Wong | B62D 35/001 296/180.2 |
| 2010/0072779 | A1 * | 3/2010 | Pfaff | B62D 35/001 296/180.2 |
| 2021/0070378 | A1 * | 3/2021 | Duncanson | B62D 35/001 |

* cited by examiner

*Primary Examiner* — Lori L Lyjak
(74) *Attorney, Agent, or Firm* — MacCord Mason PLLC

(57) ABSTRACT

A pivoting cover and cover system are shown and described. In some examples, a vehicle trailer system and a pivoting cab extender apparatus, system, kit, methods, and assembly for protecting the vehicle and vehicle parts while economically and safely covering a gap between the cab and the trailer are shown and described. In some examples the inventions may be considered a hinged wind deflector for minimizing a trailer gap and, also minimizing vehicle damage.

15 Claims, 16 Drawing Sheets

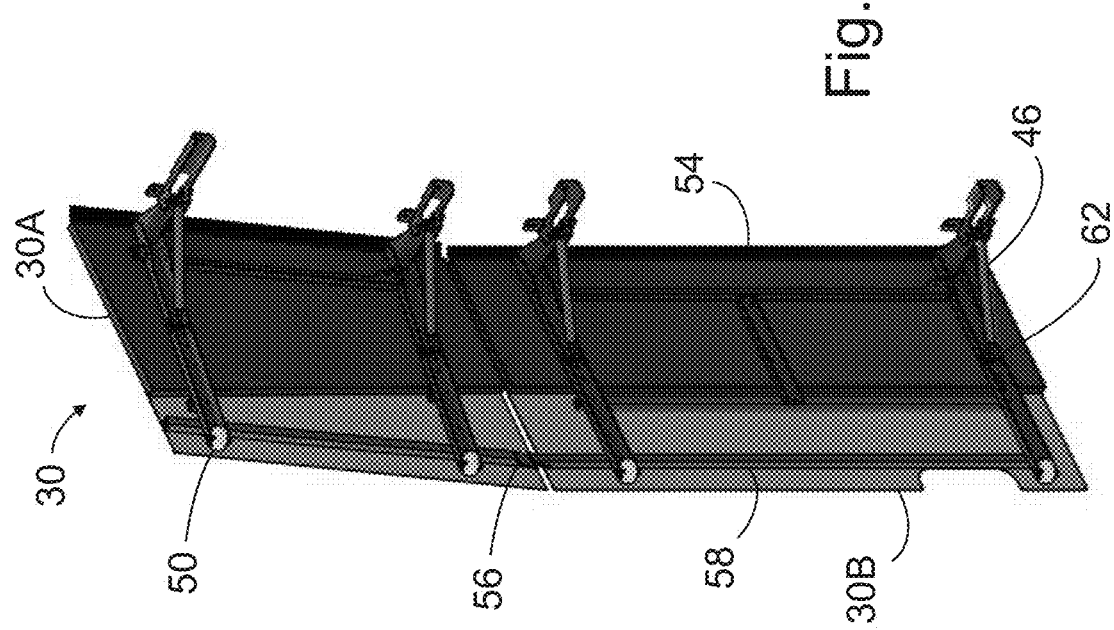

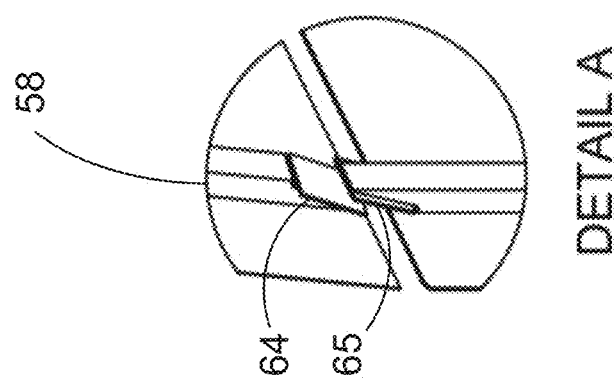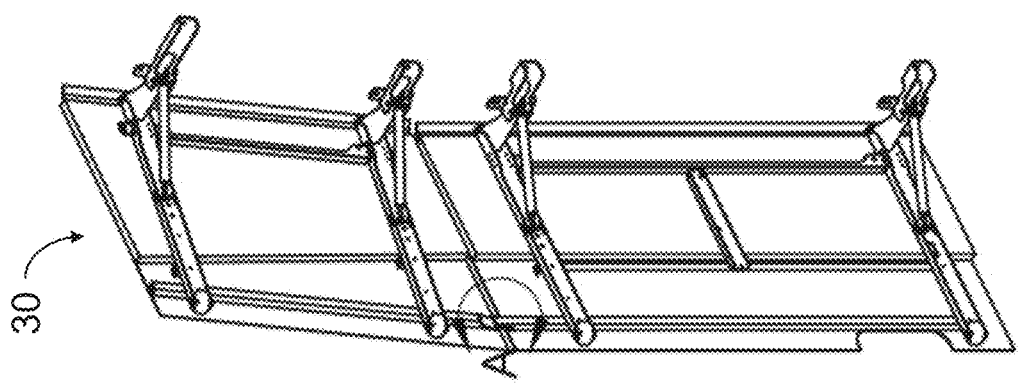

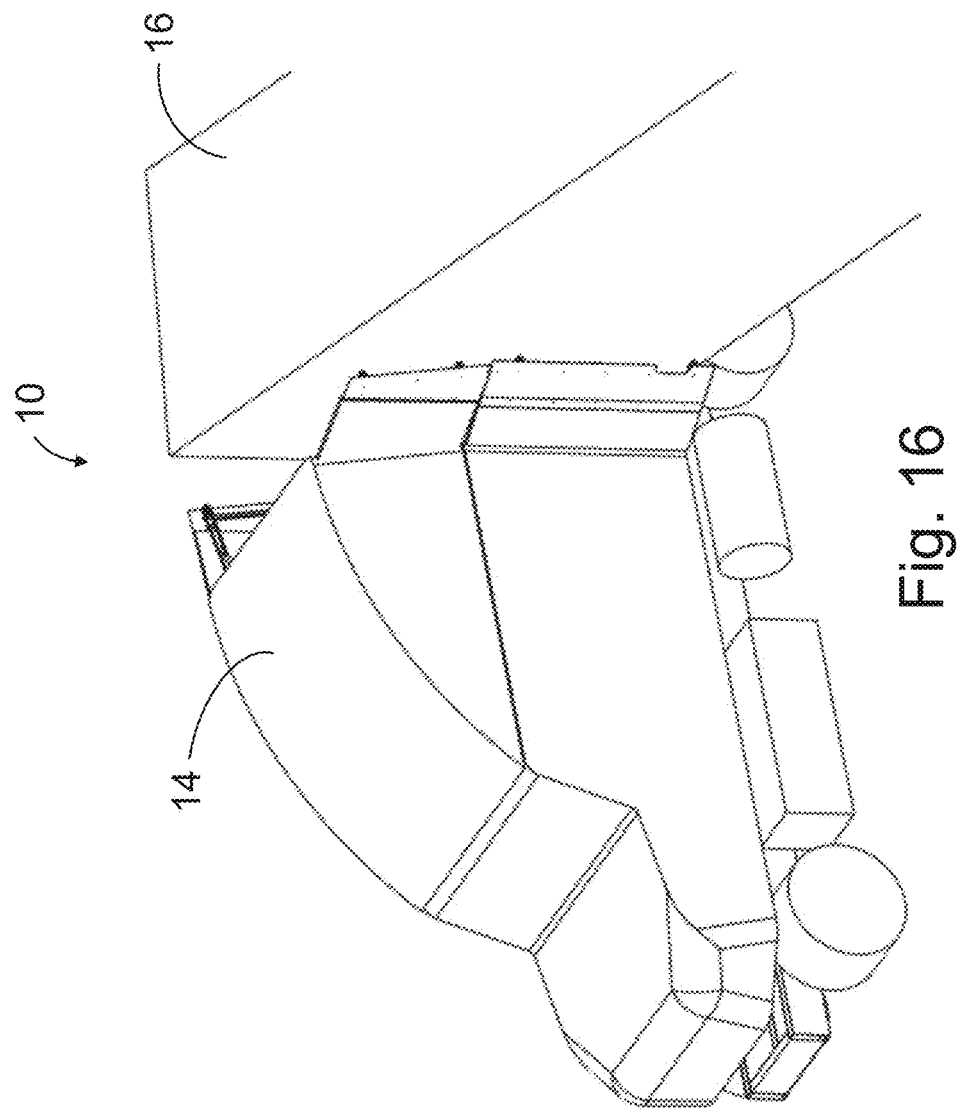

PIVOTING CAB EXTENDER APPARATUS, SYSTEM AND METHODS

This application claims the benefit of U.S. provisional application No. 62/830,890, filed Apr. 8, 2019, which is herein incorporated by reference in its entirety.

FIELD OF THE TECHNOLOGY

The inventions of the present disclosure relate generally to a pivoting cover for a gap between a vehicle and a vehicle trailer system and, more particularly, to a pivoting cab extender system for protecting the vehicle and vehicle parts while economically and safely covering a gap between the cab and the trailer.

BACKGROUND

Vehicles used for transport typically include a tractor, fitted with a cab, and a trailer, with the trailer pulled by the tractor. A space formed between the cab and the trailer forms a gap. This tractor-trailer gap is one contributor to overall aerodynamic performance of the combination vehicle. Attempts have been made to cover the gap to increase aerodynamic performance but challenges in cost, benefit and performance and tractor-trailer damage persist.

Thus, there remains a need for a new and improved gap cover for a vehicle which increases aerodynamics, is sufficiently durable, cost effective, and protective.

SUMMARY

In accordance with the present disclosure a cab extender system, apparatus, kits and methods are provided for tractor-trailers and the like. This disclosure provides improved cab extender devices, kits, assemblies and methods that are convenient, efficient, safe, cost effective, durable and protective. In some examples, embodiments as described herein may be considered as a vehicle gap cover, and in other examples, a pivoting cab extender system.

A tractor-trailer gap is a primary contributor to overall aerodynamic performance of the combination vehicle. Applicant is aware of research investigating the relationship between trailer gap and drag coefficients of the trailer. Results may be provided as drag coefficient versus a normalized trailer gap of $g/\sqrt{A}$, where g is the trailer gap and A is the cross-sectional area of the trailer. At $g/\sqrt{A}>0.5$ there is often a sharp increase in aerodynamic drag acting on the trailer. Generally, the shorter the gap between the tractor cab and trailer, the smaller the drag coefficient on the trailer. Operators that use short trailer gaps ($g/\sqrt{A}<0.5$) may benefit from further reduced trailer gaps by about 2% aerodynamic improvement per 10" of trailer gap reduction. For highway applications, this equates to roughly 1% fuel savings per 10" of trailer gap reduction. Applicant realizes minimizing the trailer gap is beneficial for optimum fuel economy, however, Applicant also recognizes challenges in the field, for example, maintaining trailer clearance for turning maneuvers.

One feature for improving trailer gap aerodynamics is a panel, for example, a cab extender. Tractor cabs may be sold with one or more cab extenders toward improved fuel economy by diverting air past the gap between the cab and trailer. Cab extenders are particularly effective at reducing cross wind induced drag on the front face of the trailer. The cab extenders may be attached to the cab and/or roof through a series of brackets. These conventional brackets are purposely designed to be fixed and non-pivoting, for example, for security and durability.

Applicant realized that a designed gap between the cab extender and trailer typically remains for at least two reasons, a back of cab access and enough room to maneuver the trailer. Back of cab access may be necessary with current tractor-trailer designs to allow for air line and electrical connections to be made/removed between the tractor and trailer. Additionally, a gap may be necessary for turning and backing maneuvers to prevent contact between the tractor cab and trailer, thus causing structural damage. In one example, a worst case maneuver for tractor-trailer contact is a jack knife event that can occur either when the truck is reversing into a loading/parking position, or in a decelerating event that causes the trailer to swing forward towards the tractor. In normal operations, the reversing scenario may be the most typical. In an effort to improve fuel economy, truck operators may position their sliding fifth wheel as far forward as possible on the frame rail, thus moving the trailer closer to the cab extenders and back of the cab. However, Applicant recognized that moving the trailer closer to the cab comes with risks. By way of example, reducing the trailer gap may increase the risk that the cab extenders, cab wall, cab roof, and trailer may all be damaged during tight maneuvers. Since cab extenders and/or cab extender brackets may be designed as the weak point, for example to break, damage may be most likely in the bracket or cab extender instead of the cab structure. Thus, challenges exist with cab extender damage and replacement cost.

Accordingly, one aspect of the inventions of the present disclosure include one or more panels to enable movement of the trailer closer to the cab while limiting the risk of damage to the cab, cab extender, and trailer when there is tractor-trailer contact, in an economical and protective manner. In some examples, the panels may include a pivot. The panels may alternate between a first non-pivot position and a second pivot position. The first non-pivot position and the second pivot position may alternate while the vehicle is in motion. The panels may be cab extenders. The inventions of the present disclosure may include brackets. The brackets may allow a pivot during movement of the vehicle. The brackets may attach to the vehicle or vehicle parts in variable ways and in variable locations. The brackets, in one embodiment, may attach to the cab and secure the panels to the cab. The panels may cover at least a portion of the tractor-trailer gap. The panels may cover only a portion of the tractor-trailer gap while leaving a portion of the gap between the tractor and the trailer.

In one example, a cab extender assembly may include a pivotable panel bracket. The bracket may include a first leg for interfacing a cab and the bracket and a second leg for interfacing an extension and panel and the bracket. An expansion member may extend between the first leg and the second leg and be configured to allow a dynamic pivot between a first closed position and a second pivoted, open position. In some embodiments, the second leg pivots about a fixed location near the forward edge of the cab extender panel and so engage a movement of a distal end of the cab extender panel to an opened second position.

Other embodiments may include a tractor trailer protection system including a tractor cab, a tractor trailer, a trailer gap between the tractor and the trailer, a set of cab extender panels extending between the tractor and the trailer in the trailer gap, and a set of cab extender brackets attaching the tractor cab to the set of cab extender panels. The cab extender brackets may engage a pivot that allows the cab extender panels to be movable between a first position and a second position.

These and other aspects of the present invention will become apparent to those skilled in the art after a reading of the following description of the preferred embodiment when considered with the drawings.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 10 is an inside perspective view of one example of a pivoting cab extender of FIG. 7;

FIG. 11 is a close-up view of a portion of a pivoting cab extender of FIG. 10;

FIG. 16 shows one example of a pivoting cab extender in use in one example of a second position according to one example of the inventions of the present disclosure.

DESCRIPTION OF EMBODIMENTS

Figure 1:
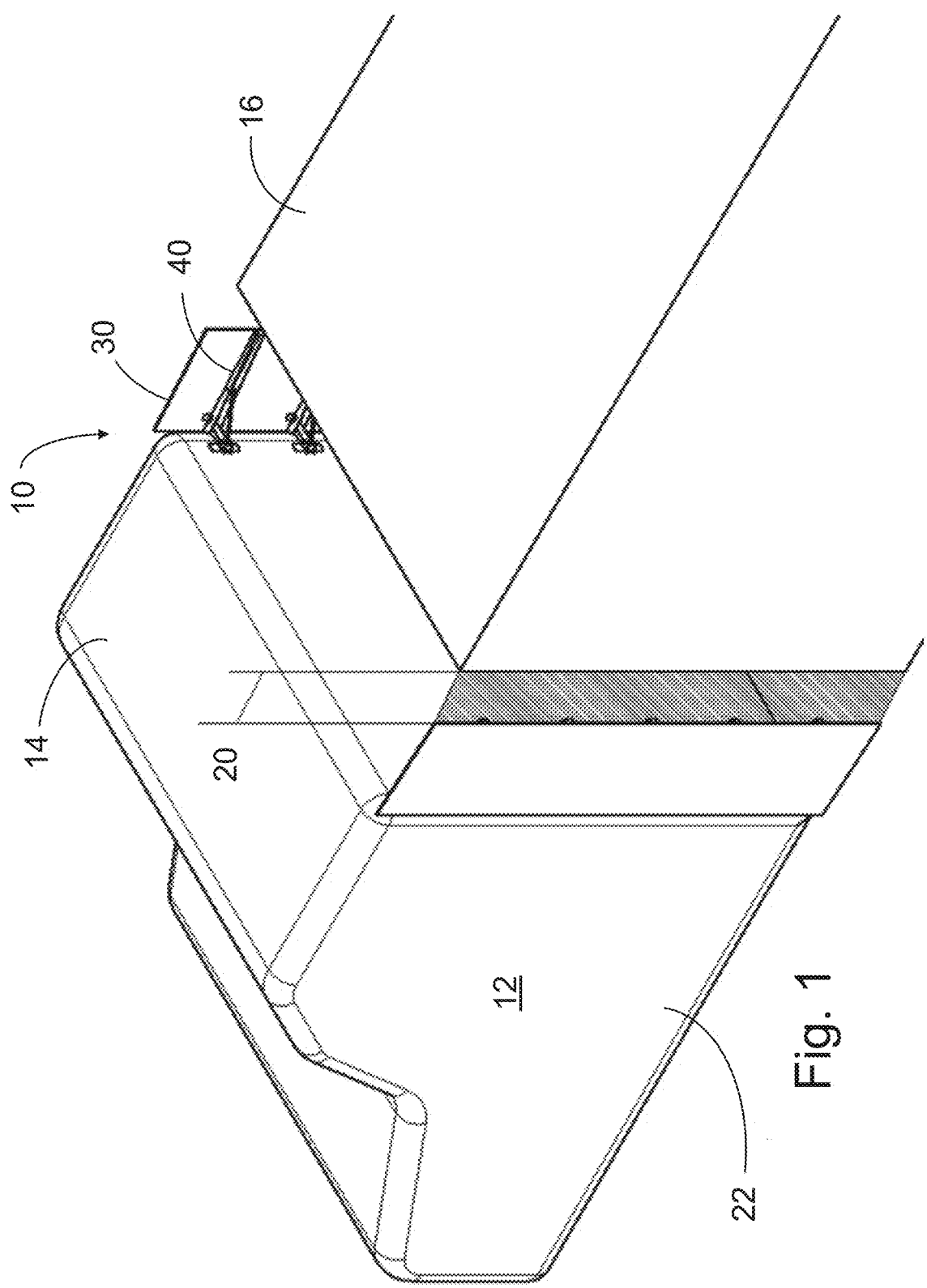
FIG. 1 is a perspective view depicting one example of a pivoting cab extender according to one example of the inventions of the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
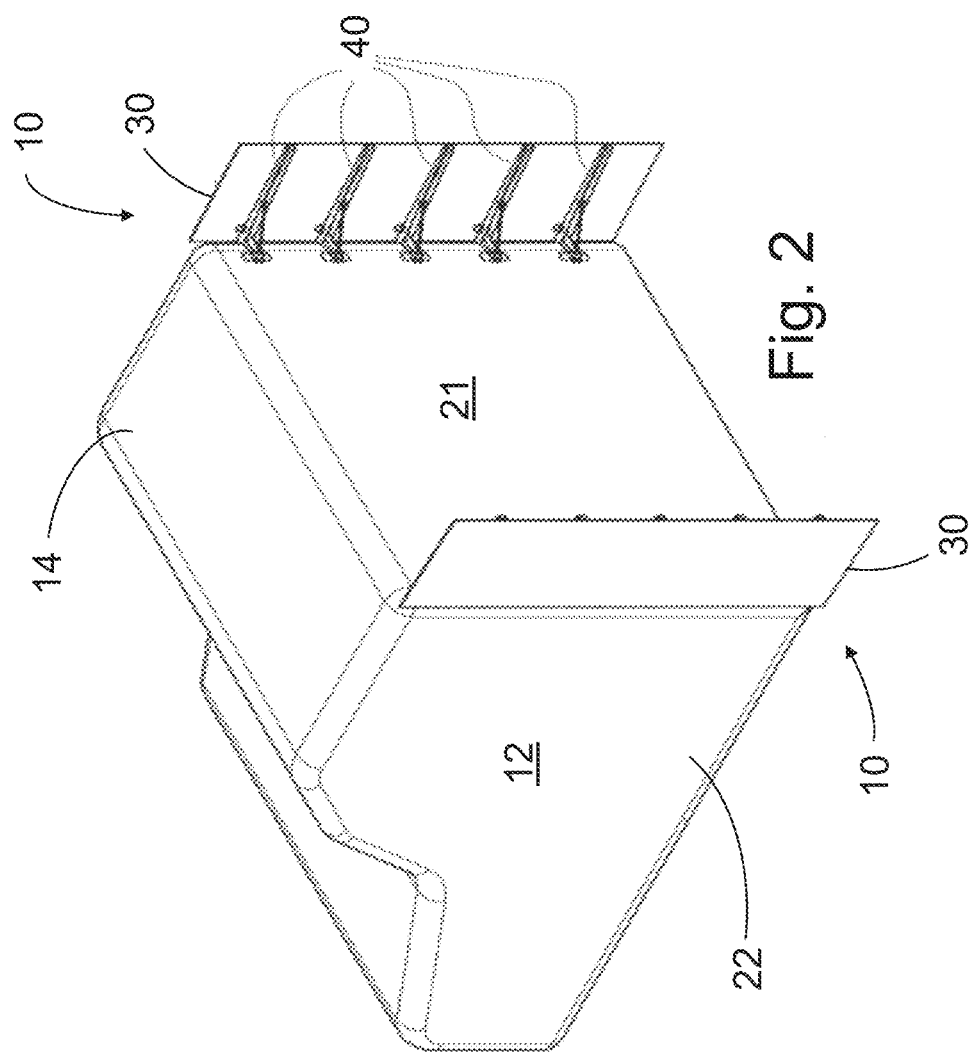
FIG. 2 is another perspective view with some parts removed and depicting one embodiment of a pivoting cab extender according to FIG. 1.
Figure 3:
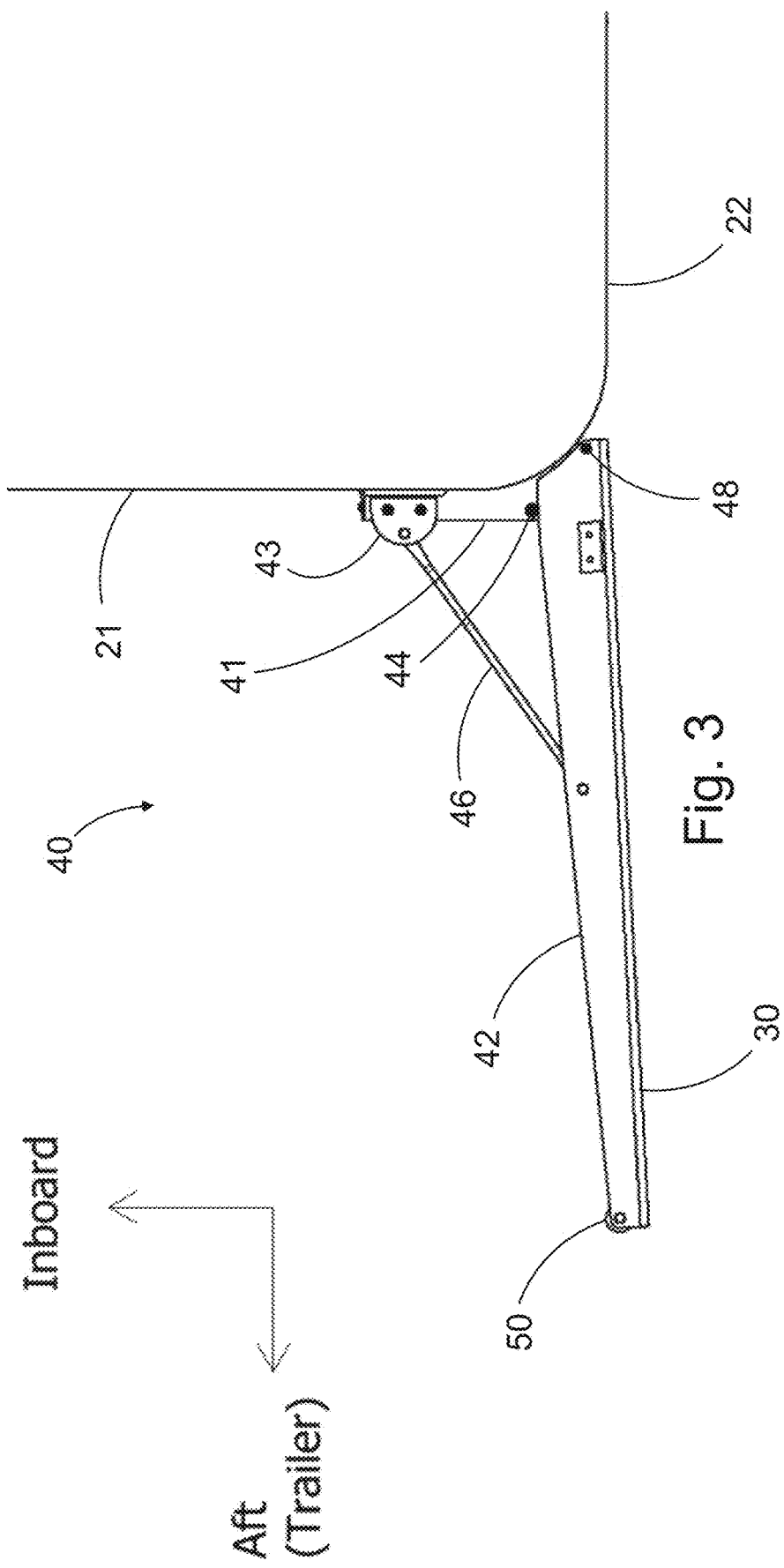
FIG. 3 is a top close-up view of one example of a pivot bracket of FIG. 1 according to inventions of the present disclosure.

Referring now to the drawings in general, it will be understood that the illustrations are for the purpose of describing embodiments of the disclosure and are not intended to limit the disclosure or any invention thereto. FIGS. 1-2 show examples of a cab extender system 10, including at least one cab extender panel 30 and at least one cab extender bracket 40. In some examples, the cab extender system 10 may include a tractor trailer having a tractor cab body 12 and a trailer 16. Between the tractor cab body 12 and the trailer 16, a trailer gap 20 may be formed. The tractor trailer body 12 may include a cab roof 14, a cab rear wall 21, and a cab side walls 22.

In this example, at least one cab extender panel 30 may attach to a tractor cab body 12. A cab extender bracket 40 may attach to a tractor cab body 12 and also to a cab extender panel 30. One or more cab extender brackets 40 may attach on one end to a tractor cab body 12 and on the other end to a cab extender panel 30. The cab extender bracket 40 may be a pivotable bracket. A cab extender and/or a cab extender system may include multiple cab extender brackets 40 for pivotably securing one or more cab extender panels 30 to a tractor cab body 12.

In some examples, a cab extender system with a cab extender panel 30 include a cab extender bracket 40 attaching on each side of a vehicle toward a rear cab corner, and in some examples, on each rear cab corner. The extender brackets 40 may interface on a cab portion with the cab rear wall and on a cab extender portion with the cab extender panel 30. A pivot 48 may be a fixed-point axis. A cab extender pivot 48 may be located between a bracket back wall attachment portion and a bracket attachment cab extender panel portion.

FIGS. 3-6 show examples of a cab extender bracket 40. A cab extender bracket 40 may include a first leg 41 and a second leg 42. The first leg 41 may be a pivot bracket cab leg for securing the first leg to a tractor cab body 12, in some examples more specifically, to a tractor cab rear wall 21. The first leg 41 may include a first leg anchor 43 for securing the first leg 41 to the cab body 12. The first leg anchor 43 may have a top securing face and a bottom securing face that each separately interface with the first leg 41 to secure the first leg to the cab body 12. The first leg 41 may, in some examples, be linear on an inward side 47 and may be non-linear on an outward side 47'. The outward side 47' may include a curved portion 49. The curved portion may be configured so that the first leg extends beyond the cab rear wall 21 and toward a cab side wall 22 at a cab corner. The extension beyond the cab rear wall may provide a clearance for a corner end of the cab extender panel 30 when the cab extender panel is in a pivoted (open) position. A corner end 51 of the first leg 41 may include a curved portion.

A second leg 42 may be a pivot bracket panel leg for mating with a cab extender panel 30. In some examples, the second leg 42 may be longer in length than the first leg 41. In other examples, second leg 42 may extend the entire length of or substantially the length of the cab extender panel 30. Still in other embodiments, at least a portion of the second leg 42 may extend beyond the cab extender panel 30. The second leg 42 may include a pivot bracket trailer movement facilitator 50. The movement facilitator 50 may facilitate movement of the cab extender panel 30 across a surface of a trailer 16. In some examples, the movement facilitator 50 may be a roller, bearings, skid plate, etc. and/or any embodiment that allows the cab extender panel 30 to move along the trailer 16. The movement facilitator 50 may be located, by way of example, toward a distal end of the second leg 42, away from a proximal corner end of second leg 42. The second leg 42 may include an inner side 57 and an outer side 57'. In some examples, the inner side 57 and/or the outer side 57' may be linear. A corner end of the second leg 42 may include a non-linear, curved surface 58. A second leg anchor 59 may secure second leg 42 to the cab extender panel 30. Second leg 42 may attach directly to the cab extender panel 30 by way of screws, bolts, adhesive, etc. Second leg anchor 59 may have a top securing face and a bottom securing face. Second leg 42 may fit between the securing faces of second leg anchor 59 and be secured therein.

An expansion member 46 may extend between first leg 41 and second leg 42. The expansion member 46 may expand between the first leg 41 and second leg 42. The expansion member, by way of example, may be partially or wholly or integrating of a spring or elastic, expansive/contractive portion that allows for expansion and contraction along the expansion member 46. In some examples, an expansion member 46 may include a hydraulic or pneumatic damper. The expansion member 46 may be attached to the first leg at one end and attached to the second leg 42 at an opposite end. By way of example, the expansion member 46 may be attached to first leg 41 and/or second leg 42 by way of screws, bolts and/or a pivot bracket pin. The expansion member may include an expansion and a contraction that is a resilient contraction that returns the expansion member to an original closed position. The expansion member 46, by way of example, may include a bungee, retractable type of portion.

The bracket 40 may include an inboard stop 44 that controls/restricts the movement of the pivot of the bracket as it returns to a closed position. The bracket 40 may include a pivot bracket attachment, by way of example, a screw, bolt and/or a pivot bracket pin.

The cab extender bracket 40 may be pivotable between a first position (closed position) and a second position (open position). The cab extender bracket 40 may pivot, in some embodiments, to an angle alpha, and/or to an angle alpha prime, between angle alpha and angle alpha prime and/or to any position up to or exceeding angle alpha prime. Angle alpha may be in some examples between 0 and 10 degrees. Angle alpha prime may be, in some examples, between 0 degrees and 90 degrees, and in other examples beyond 90 degrees and in still other examples between, 10 degrees and 70 degrees. The bracket 40 may be configured to pivot in excess of 90 degrees or to any range below 90 degrees. In some examples the cab extender bracket may pivot between within a range of between 1 degree and 50 degrees. The pivotable area allows, in some examples, the cab extender bracket to extend a flexibility to the extender bracket panel to be automatically pivotable and expandable to allow movement of a trailer along an underside of the cab extender panel. In some instances, the expandability of the cab extender panel does not require manual adjustment for the panel 30 to move from the first position to the second position to accommodate the movement of the trailer as the vehicle is in motion.

Figure 4:
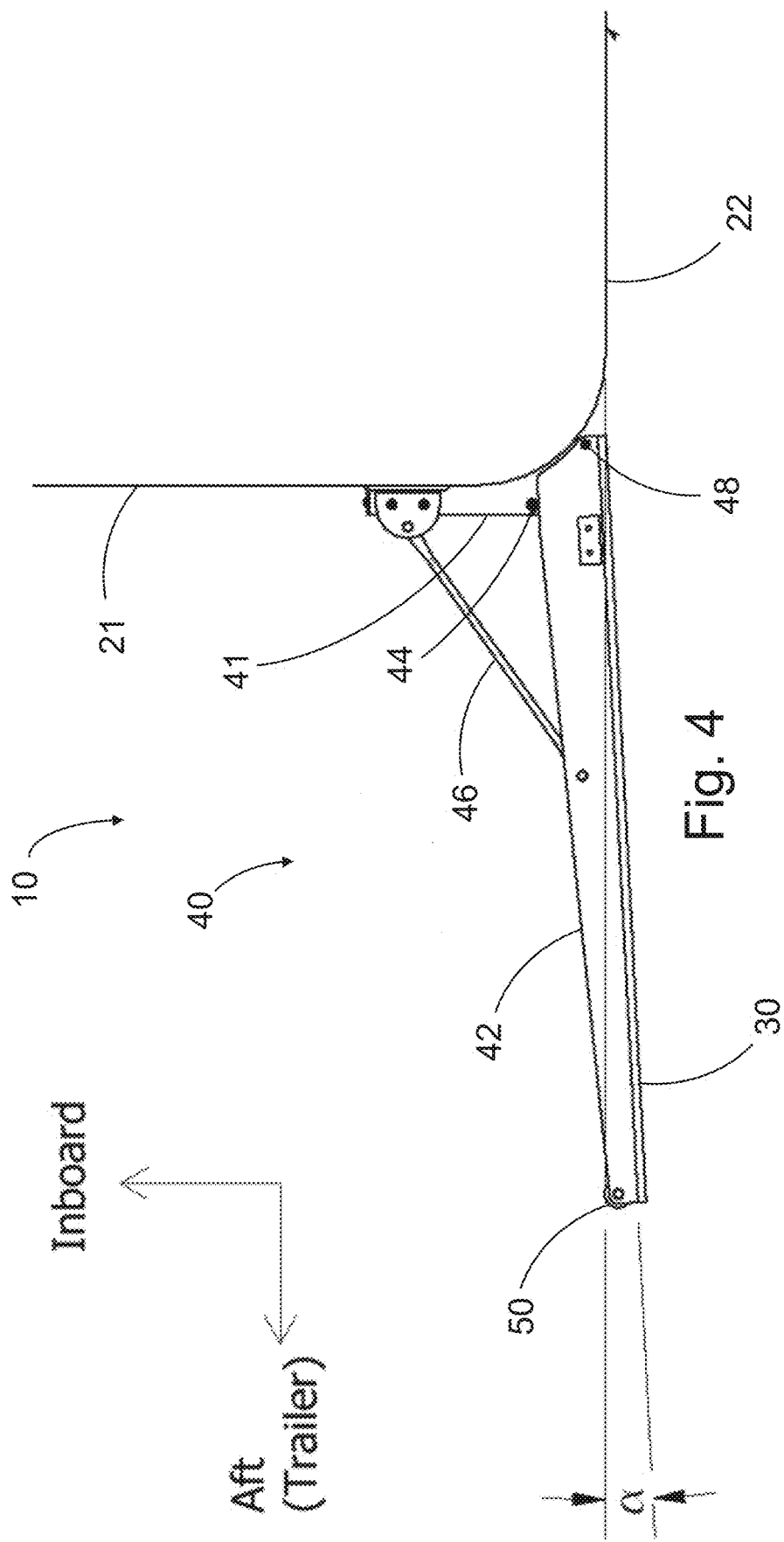
FIG. 4 is a top close-up view of one example of a pivot bracket of FIG. 1 in an inboard (closed) position according to inventions of the present disclosure.
Figure 5:
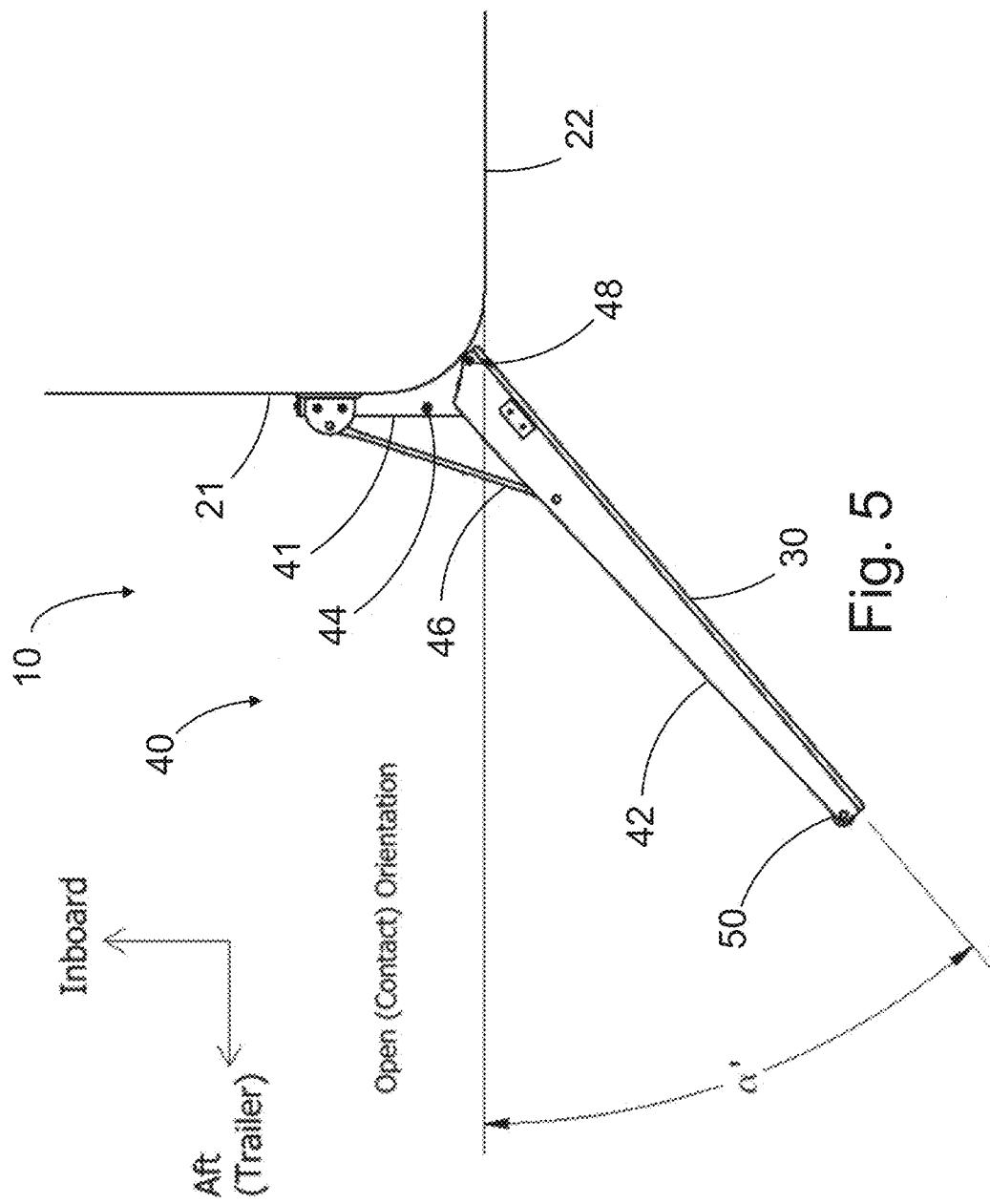
FIG. 5 is a top close-up view showing one example of a pivot bracket of FIG. 1 in an outboard (open) position according to inventions of the present disclosure.
Figure 6:
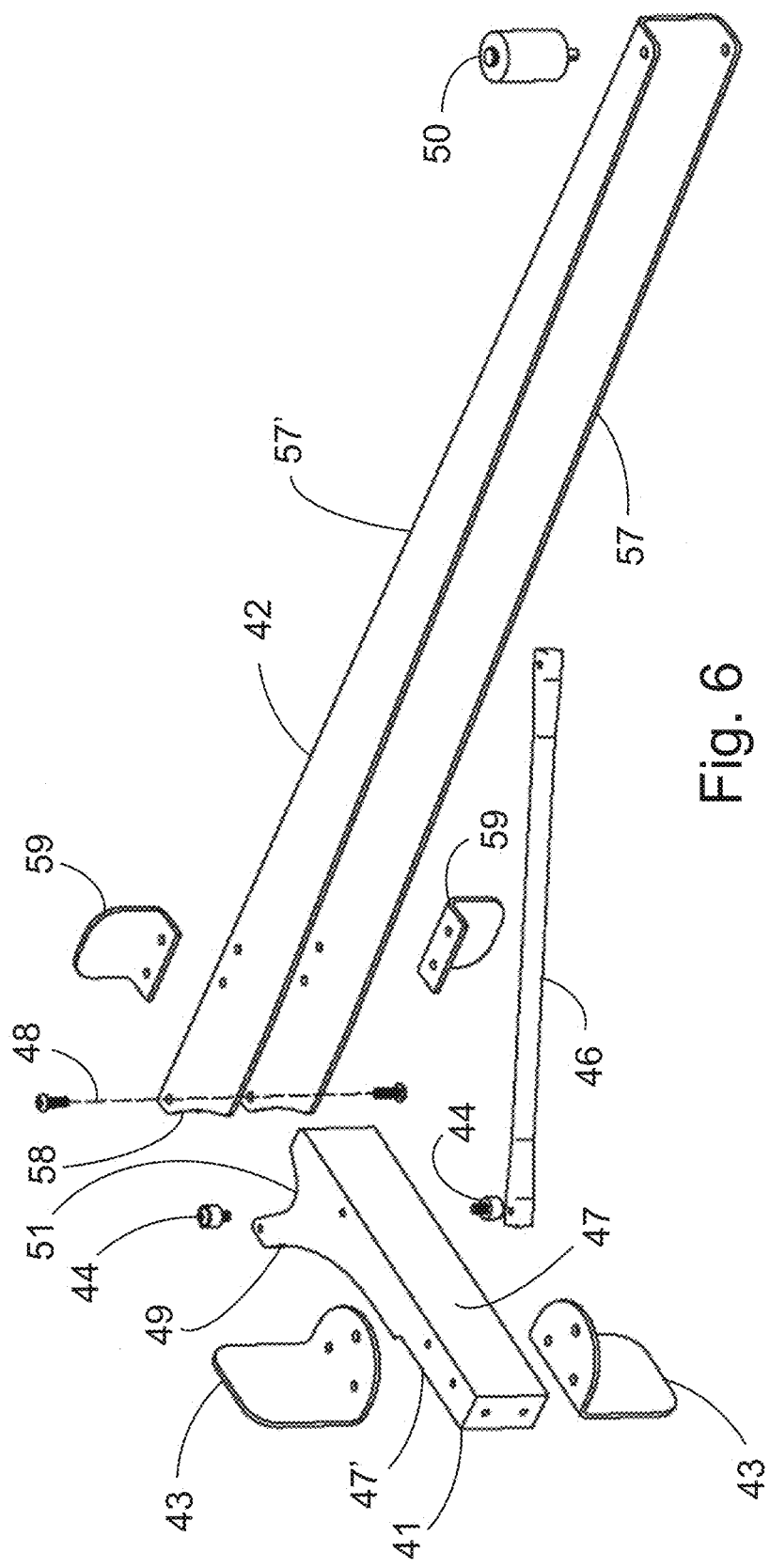
FIG. 6 is an exploded view of one example of portion of a pivot bracket of a cab extender system according to FIG. 1.

Other embodiments may be considered in one example, a tractor trailer protection system including a set of pivot brackets 40. A set of pivot brackets 40 (See FIGS. 3-5) may allow for an outboard rotation of the cab extender (open orientation) when an outboard acting force is applied to the cab extender, as shown in FIG. 5. The set of pivot brackets may not allow a substantially inward rotation beyond a closed position (typically generally aligned with the angle of the cab side wall) as shown in FIG. 4, by way of example restricted by a stop 44. There may be deviation of +/−5 degrees at the closed position and/or the closed position may be a set position with a hard stop position set in the closed position.

The set of pivot brackets 40 may rotate about a pivot axis 48, which may be a fixed point axis, near the forward edge of the cab extender panel 30. The set of pivot brackets, in some embodiments, may be configured to be retro-fit with industry standard fittings/slots in a cab body 12 and in a cab extender panel 30 for attachment of the set of pivot brackets 40 in a plug and play fashion that requires minimal alteration to the tractor trailer and/or requires minimal to no additional modification to the tractor trailer parts, by way of example cab extender panel 30, cab wall 21 22, and cab roof 14. In this manner, Applicant provides a retro-fit, industry standard attachment panel with improvements that allow for an automatic pivot adjustment panel where the panel alternates automatically between an open and closed position while the vehicle is in transit and without manual adjustment and during movement.

The invention may be considered a pivot bracket 40. A set of pivot brackets 40 are strong enough to adequately support any existing set of cab extender panels 30 and transfer load from the cab extender panel 30 into the primary cab structure 21. Typical loads on some cab extender panels 30 include aerodynamic loads (such as wind loads), and inertial loads (usually road surface induced). Cab extender bracket 40 includes an adequate pivoting stiffness and dampening to avoid excessive vibrations or displacements under such loads, while still being flexible enough to rotate/pivot outboard upon a typical trailer contact load. In some examples, a rotational stiffness may be in a range of about 5 in-lbs/degree to about 50 in-lbs, and in other examples about 20 in-lbs/degree to about 60 in-lbs/degree. Other rotational stiffness measures may be outside of this range or occur in smaller ranges under this disclosure. Pivot brackets 40 also enable easy back of cab access. In one embodiment, the pivot bracket may include a disconnect for the expansion member 46 that attaches to the cab extender first leg 41 and/or the second leg 42 of the bracket 40. In one example, Applicant's invention allows disconnecting one or multiple expansion members, for example spring/elastic portions, when the tractor is parked and allows easier opening of the cab extender panels 30.

In some embodiments, the pivotable nature of the cab extender bracket 40 allows the cab extender panels 30 to be movable, by way of example pivotable, during a vehicle turn and while the tractor trailer is in motion, allowing the movement facilitator 50 to slidable engage with the trailer 16 and to pivot the panels 40 outward without damage to the panels 30, the cab body 12 and/or the trailer 16. The panels 40 are movable during vehicle movement so that manual adjustment of the panels is not required of the driver. The pivotable nature of the cab extender bracket 40 also allows a trailer gap 20 to be reduced beyond what was compatible conventionally in the industry with avoiding cab 12, panel 40 and/or trailer 16 damage. While a trailer gap conventionally only minimally allows for about 24 inches, Applicant's inventions of the present disclosure may, in some instances, allow reduction of the trailer gap by half of this number. In some examples, a trailer gap of under 20 inches may be achieved. In other examples, a trailer gap of under 15 inches may be achieved. Still in other examples, a trailer gap of between 10 inches and 23 inches may be realized, and in other examples a trailer gap of less than 5 inches, and in some examples of around less than 1" and close to zero may be achieved, with ranges being exemplary in nature, and smaller ranges between this range also being possible.

Figure 7:
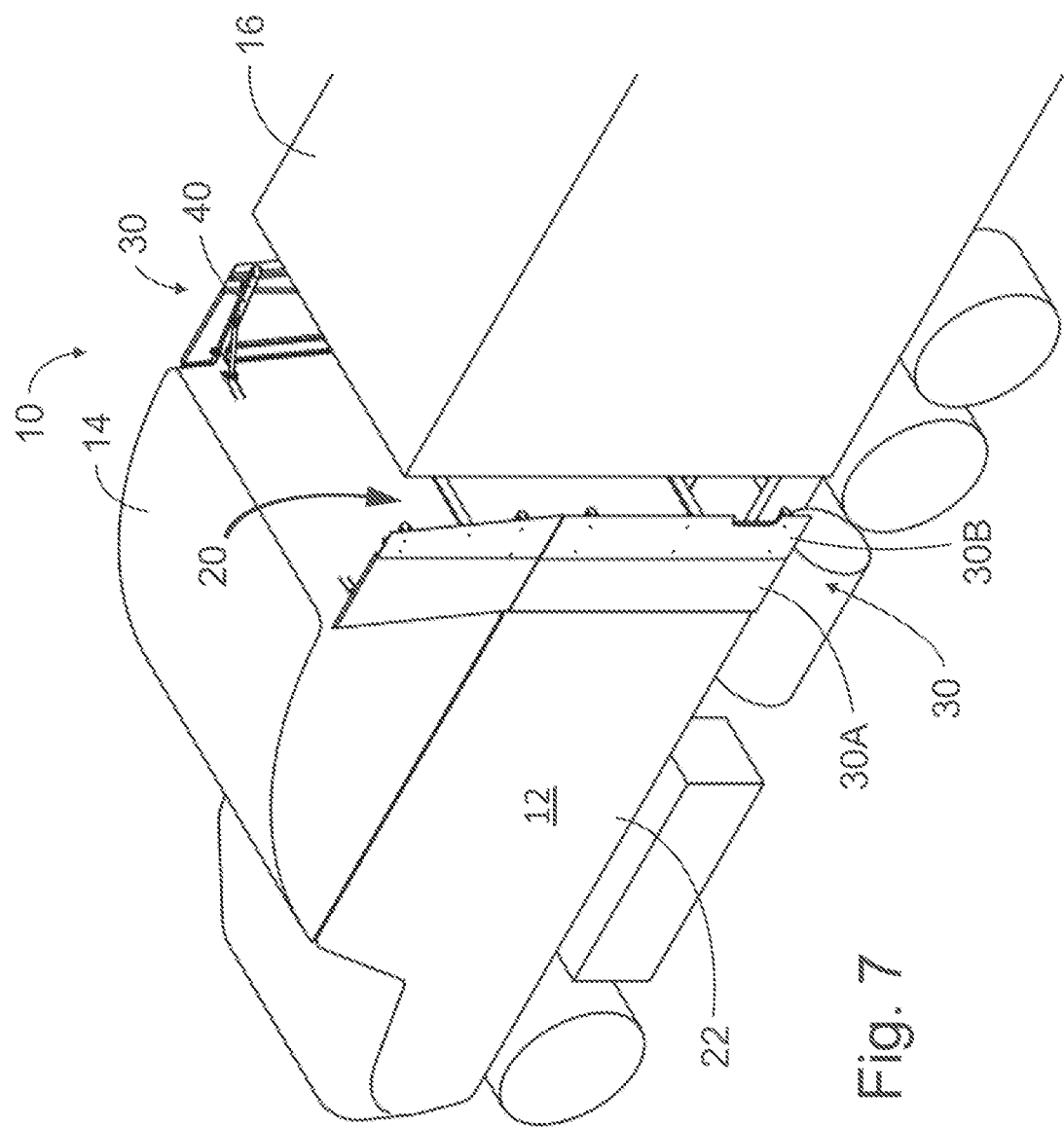
FIG. 7 is a perspective view depicting another example of a pivoting cab extender according to one example of the inventions of the present disclosure.
Figure 8:
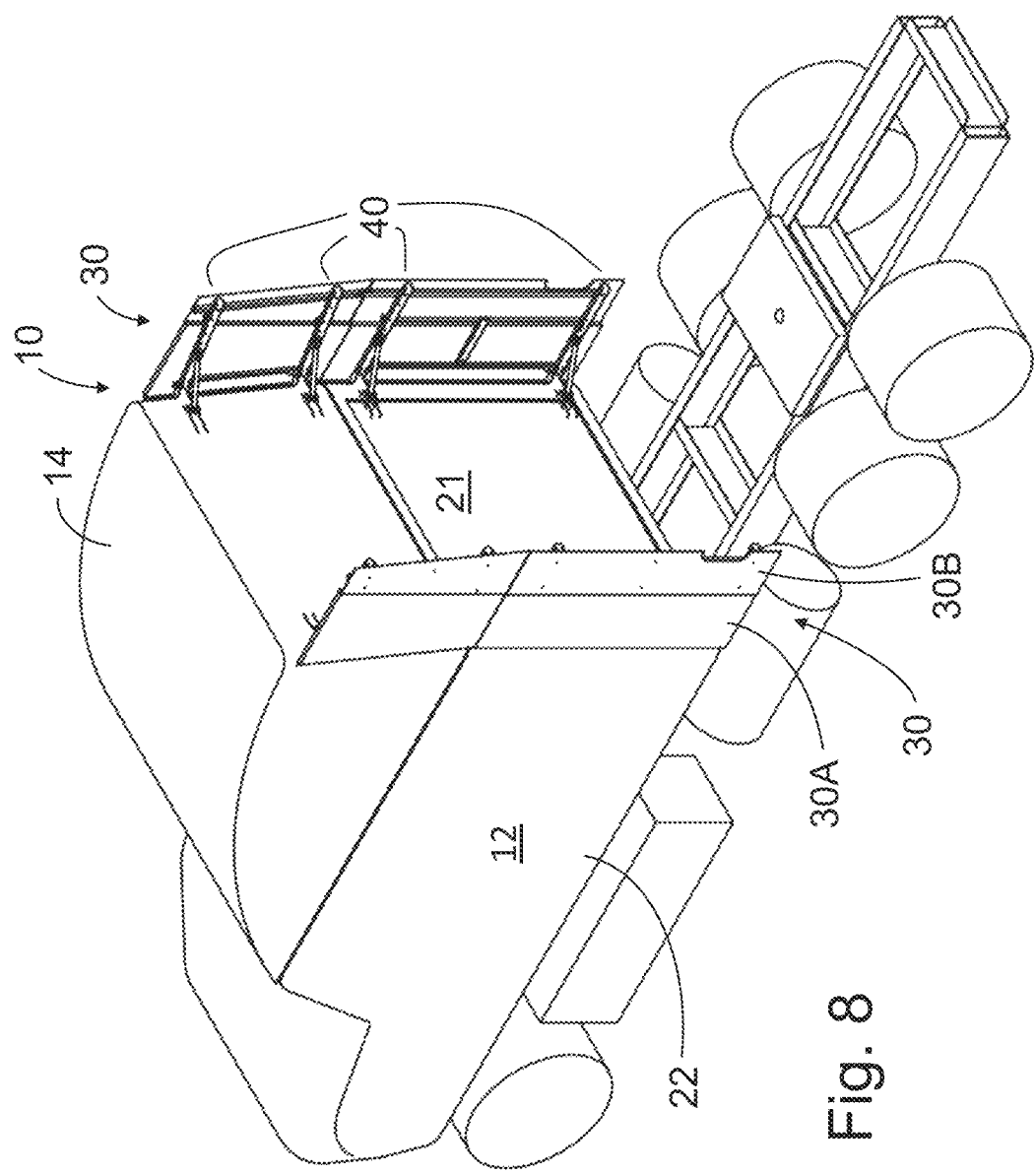
FIG. 8 is another perspective view with some parts removed and depicting one embodiment of a pivoting cab extender according to FIG. 7.
Figure 9:
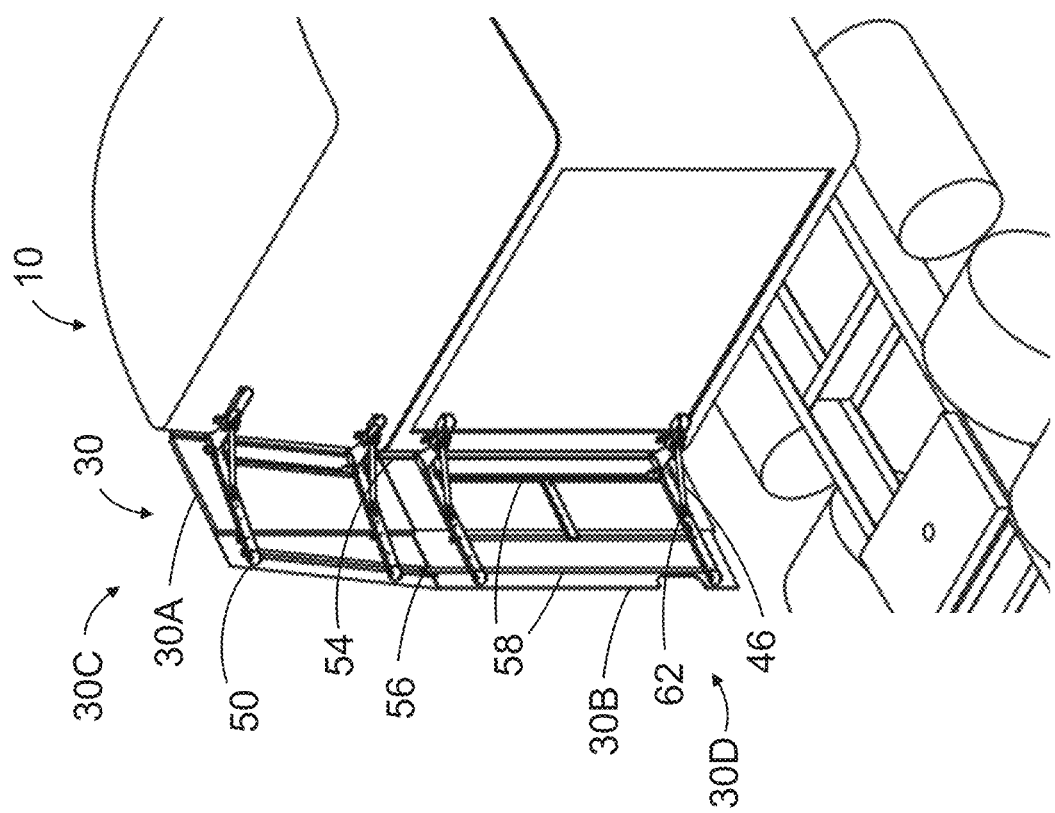
FIG. 9 is a perspective view of the attachment of one example of a pivoting cab extender of FIG. 7 according to inventions of the present disclosure.
Figure 12:
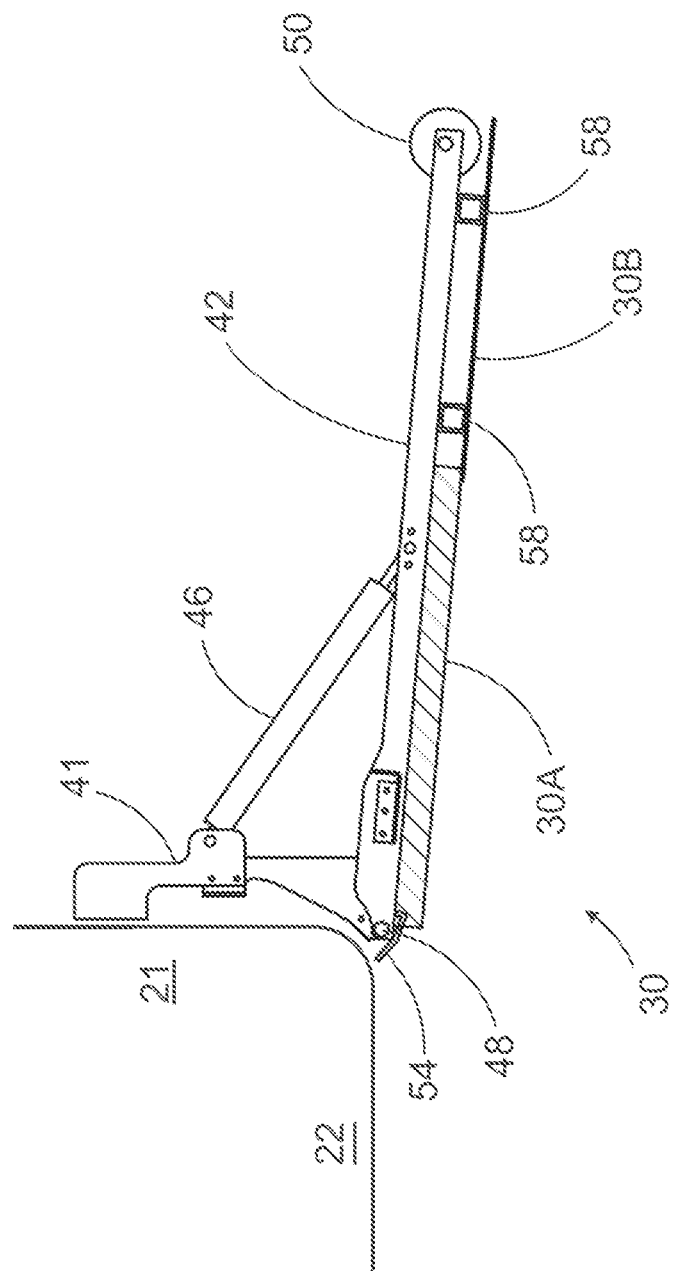
FIG. 12 is a top close-up view of one example of a pivot bracket of FIG. 7 according to inventions of the present disclosure.
Figure 13:
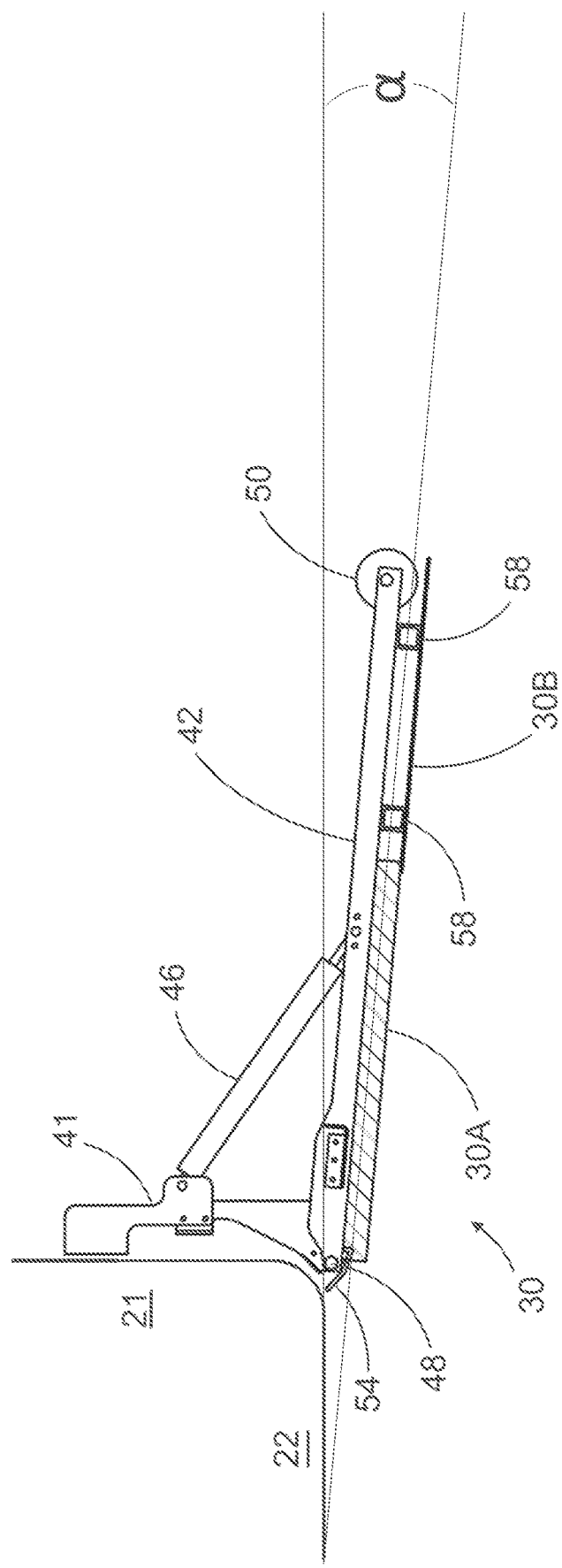
FIG. 13 a top close-up view of one example of a pivot bracket of FIG. 7 in an inboard (closed) position according to inventions of the present disclosure.
Figure 14:
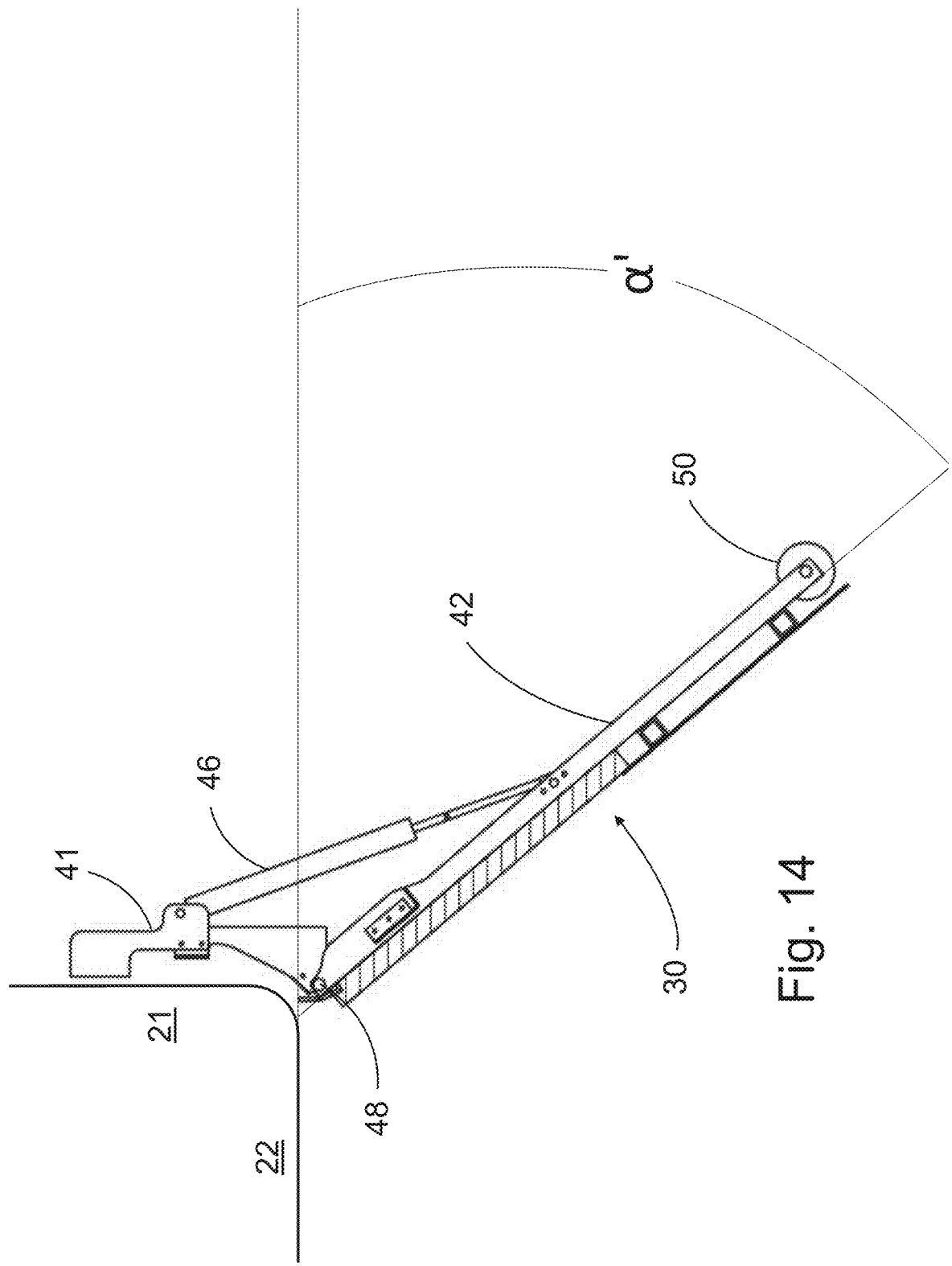
FIG. 14 is a top close-up view showing one example of a pivot bracket of FIG. 7 in an outboard (open) position according to inventions of the present disclosure.
Figure 15:
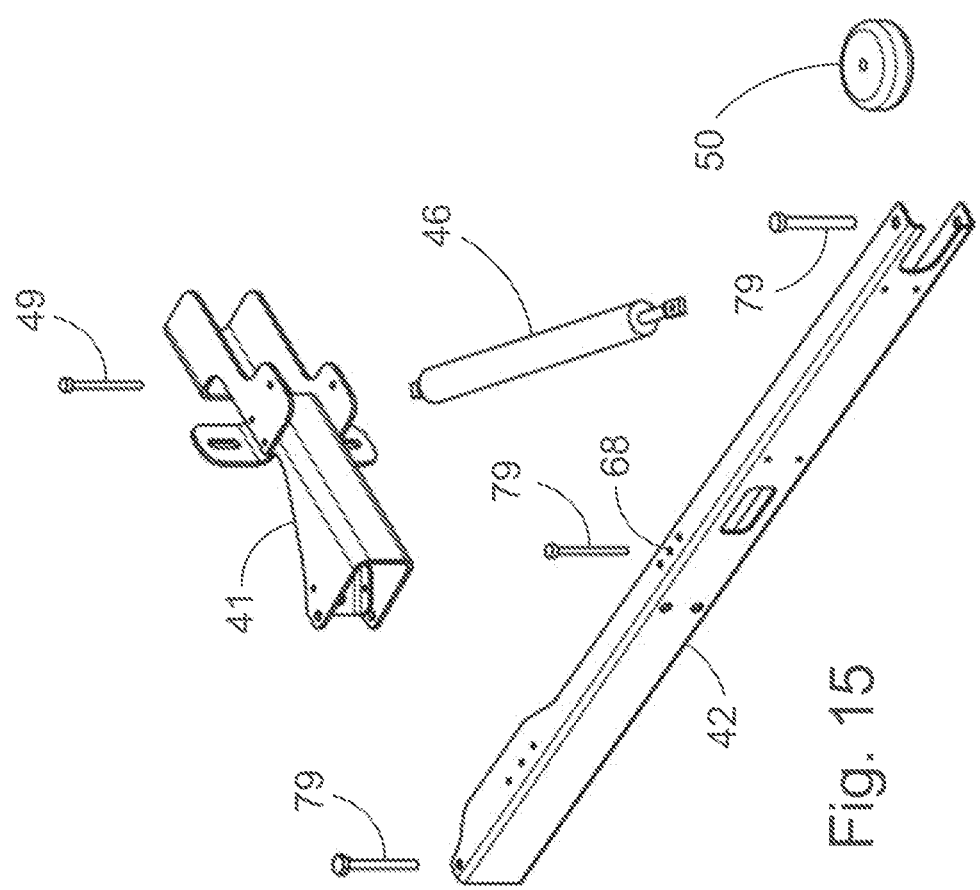
FIG. 15 is an exploded view of one example of portion of a pivot bracket of a cab extender system according to FIG. 7.

FIGS. 7-9 show another embodiment of a cab extender system 10 including a cab extender bracket 40. A panel 30 may include a primary panel 30A and a secondary panel 30B. The secondary panel 30B may be an extender for aerodynamics and increased pivot functionality. The secondary panel 30B may be separate from primary panel 30A but aligned and/or interfaced with primary panel 30A on the cab extender bracket 40.

Additionally, as seen in one example in FIG. 10, the panel 30 may be divided between a upper portion 30C and a bottom portion 30D. An overlap 56 may be included between upper portion 30C and bottom portion 30D. Overlap 56 may account for different rotational axis that may exist in relation to upper portion 30C and bottom portion 30D as related to the angle of the cab. FIG. 11 shows an enlarged view of one example of an overlap between upper portion 30C and bottom portion 30D including upper plate 64 and lower plate 65, collectively creating a slip surface.

Panels 30 may include a reinforcement 58. Reinforcement 58 may be considered a stiffening member running along an interior surface of a panel 30. In some examples, a reinforcement 58 may span substantially vertically along the entire panel 30 or a portion of a panel 30A, 30B, 30C, 30D included in the larger panel. In some instances, there may be a pair of reinforcements 58 aligned vertically along a panel 30. In other examples, a reinforcement may be a horizontal reinforcement. At least two horizontal reinforcements 58 may be paired along a panel 30. Reinforcements 30 may be rigid enough to provide support to the panel 30, while still allowing a flexibility for the panel 30 pivot.

A seal 54 may be included in panel 30. A seal 54 may be a leading-edge seal. Seal 54 may span a panel 30-cab 12 gap to increase aerodynamics.

An alignment module 62 may be included for adjusting the panel in a closed position to a variable beginning closed position for alignment of the system with the vehicle as needed.

A cab extender panel 30 may be integrally formed with a second leg 42, forming an integrated panel/leg piece. In this example, the inventions may include a molded plastic part with integral stiffening members/reinforcements 58. The expansion member may attach to first leg 41 and to an integral stiffening member/reinforcement 58 of the panel/leg piece. In one embodiment, a stiffening member/reinforcement may serve as a second leg 42.

FIGS. 12-15 show examples of one embodiment of a cab extender bracket 40 for a panel 30. Any of the parts of embodiments may be combined and is considered within the scope of the inventions of the present disclosure. A first leg 41 may include an attachment to an expansion member 46 in a substantially medial position of the first leg 41, away from the ends of the first leg. An expansion member 46 may include a hollow sleeve. An expandable expansion piece may span the hollow sleeve and be exposed on one or both sides of the hollow sleeve. By way of example, a bungee type cord running through the sleeve and attaching on one end to the first leg 43 and on the other end to the second leg 42 to flexibly secure the first leg and second leg together to work as a unit, may be included. The sleeve may act as a stop toward setting or limiting the attainable closed position and the bungee may act as an elastic recoil to allow pivotability with retraction back to a closed position. In other examples, an expansion member may include a spring-damper system enclosed in a sleeve-like casing. Attachments 79, for example pins, bolts, and/or lock pins, may be included to secure attachment parts of the cab extender bracket 40, by way of example through openings 68.

In some examples the inventions may be considered a hinged wind deflector for minimizing a trailer gap and, also minimizing vehicle damage during vehicle turns while the vehicle is in motion. As seen in FIG. 16, in operation, Applicant's invention provides a solution that allows operators to utilize shorter trailer gaps while allowing access to the back of the cab and limiting the risk of damage to any tractor or trailer components as a vehicle makes a turning motion and the cab and trailer, during the turn maneuver, move closer to one another. Inflatable extenders and the like have been employed to try to address the extent of the trailer gap. Problems with these proposed solutions includes at least the excess cost and complexity required to provide adequate back of cab access and damage prevention to structural components during tight maneuvers. In some examples, Applicant's invention includes, allowing the operator to move the trailer closer to the cab while limiting the risk of damage to the cab, cab extender, and the trailer when there is tractor-trailer contact. In certain embodiments, this reduced risk is achieved by allowing one or more cab extender panel 40 to rotate outboard in the event of trailer contact. In some examples, the inventions of the present disclosure include cab extender mounting brackets that are pivotable. A challenge, recognized by Applicant, with a bracket allowing movement, is that it must still securely attach a cab extender panel 40 to the cab 12 and/or roof 14 while allowing a pivot/movement.

Numerous characteristics and advantages have been set forth in the foregoing description, together with details of structure and function. In one example, methods for a pivotable cab extension by way of any of the embodiments herein are considered within the scope of this invention. Also, kits including a combination of parts from any of the embodiments disclosed herein are considered within the scope of this invention. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A cab extender for a tractor trailer cab comprising:
   a pivotable panel bracket,
   a first leg of the pivotal panel bracket for interfacing a cab and the bracket,
   a second leg of the pivotal panel bracket for interfacing an extension panel and the bracket, and
   an expansion member extending between the first leg and the second leg and configured to allow a dynamic pivot between a first position and a second position of the extension panel.

2. The bracket of claim 1 including a movement facilitator toward a distal end of said a second leg.

3. The bracket of claim 2 wherein said second leg pivots about a fixed location near the forward edge of said cab extender panel to engage a movement of a distal end of the cab extender panel to an opened second position.

4. The bracket of claim 3 wherein said opened second position may include a pivot at the distal end of up to an angle alpha prime.

5. The bracket of claim 3 wherein a pivot engages an outboard rotation of said cab extender bracket when an outboard acting load is applied to the cab extender bracket.

6. The bracket of claim 5 wherein the cab extender bracket returns to a first position in an operating condition.

7. The bracket of claim 6 including a stop located on the first leg of the bracket.

8. The bracket of claim 6 wherein an operating condition is in the range of 0 degrees to 10 degrees.

9. The bracket of claim 1 wherein said expansion member includes an expandable portion including a pre-tensioning.

10. A tractor trailer protection system including:
a tractor cab,
a tractor trailer,
a trailer gap between the tractor and the trailer,
a set of cab extender panels extending between the tractor and the trailer in the trailer gap, and
a set of cab extender brackets attaching said tractor cab to the set of cab extender panels,
wherein said cab extender brackets engage a pivot that allows the cab extender panels to be movable between a first position and a second position,
wherein an opening angle is maintained by a stop located on a fixed leg of said brackets to prevent contact between the tractor cab and one of the cab extender panels when the cab extender panel is in an open position.

11. A tractor trailer protection system including:
a tractor cab,
a tractor trailer,
a trailer gap between the tractor and the trailer,
a set of cab extender panels extending between the tractor and the trailer in the trailer gap, and
a set of cab extender brackets attaching said tractor cab to the set of cab extender panels,
wherein said cab extender brackets engage a pivot that allows the cab extender panels to be movable between a first position and a second position,
wherein each of said cab extender brackets includes a first fixed leg, a second movable leg, and an expansion member.

12. The system of claim 11 wherein said cab extender brackets are movable upon interaction with the trailer such that the cab extender panels slidable engage with the trailer.

13. The system of claim 10 wherein said set of cab extender panels are pivoting covers for the trailer gap along vertical sides of a tractor trailer.

14. The system of claim 13 wherein said set of cab extender panels minimize a trailer gap to below twenty inches.

15. The system of claim 13 wherein each of the cab extenders of the set of cab extenders includes a primary panel and a secondary panel.

* * * * *